Nov. 15, 1960 D. C. BEAULIEU 2,960,243
METHOD AND APPARATUS FOR STACKING SHEET MATERIAL
Original Filed Dec. 29, 1953 4 Sheets-Sheet 1
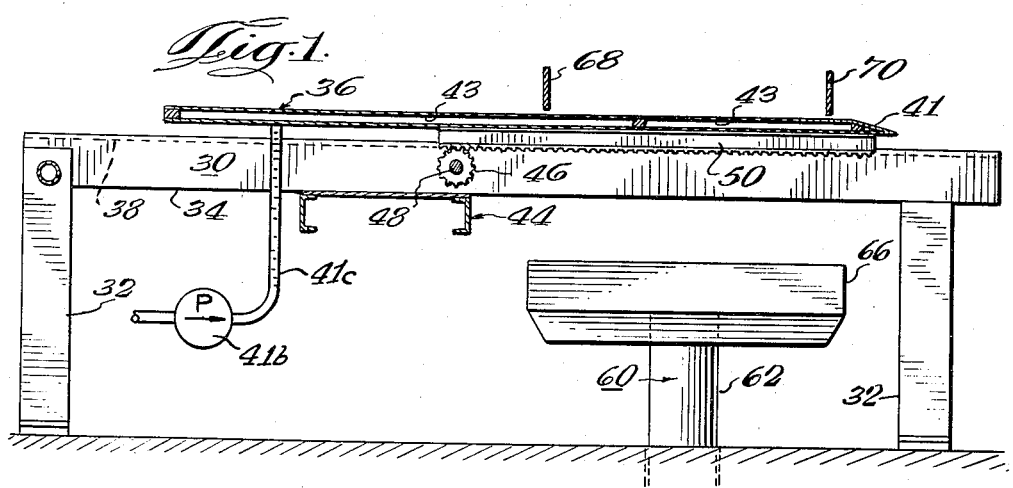
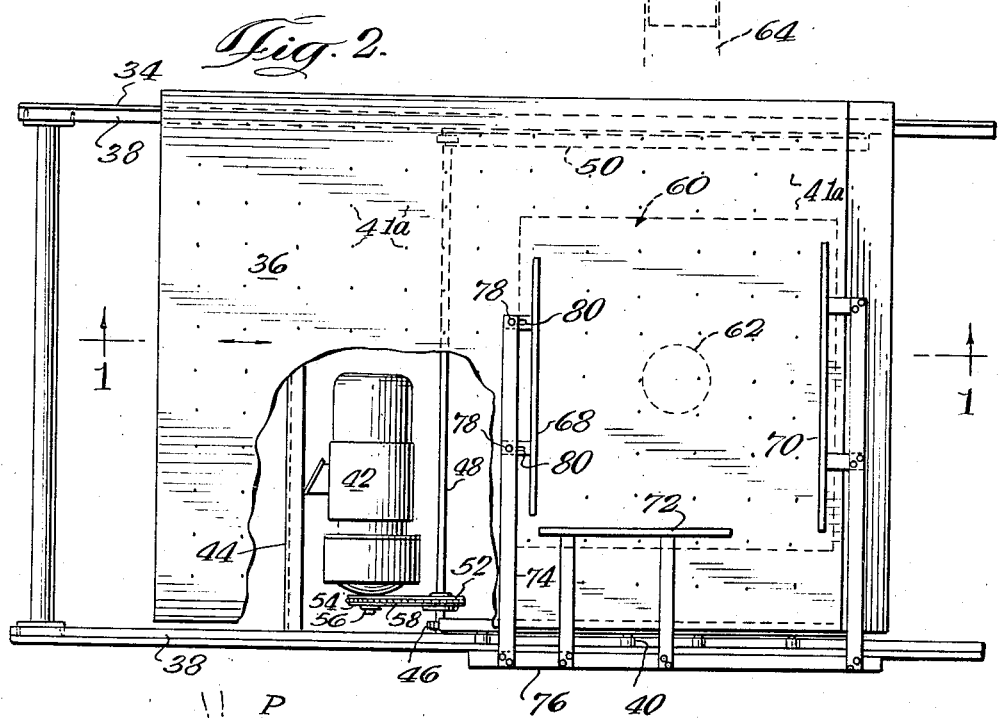
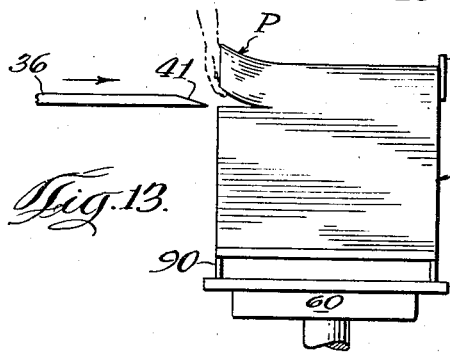
Inventor
Delton C. Beaulieu
By
Soans, Glaister & Anderson
Attorneys

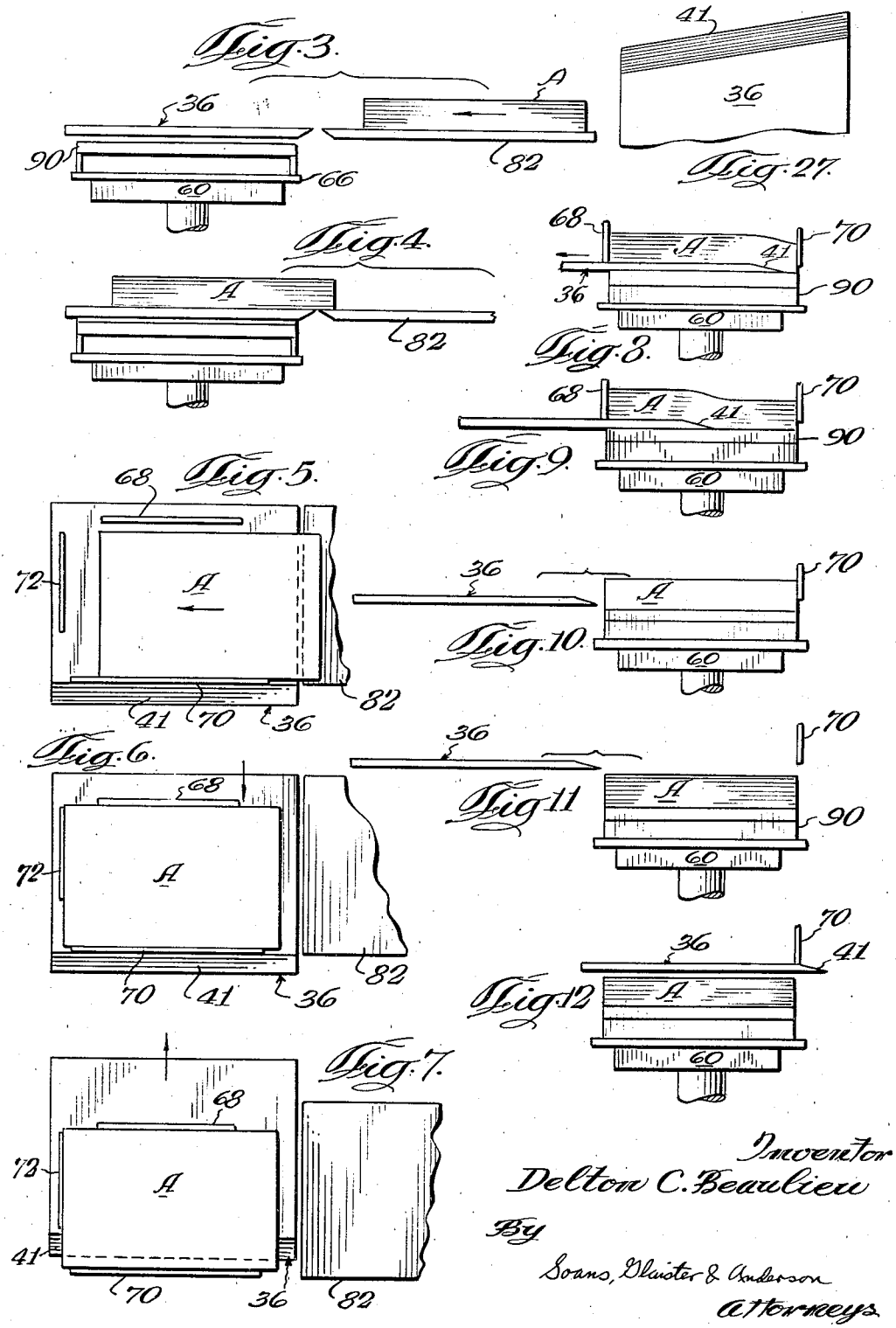

Nov. 15, 1960 — D. C. BEAULIEU — 2,960,243
METHOD AND APPARATUS FOR STACKING SHEET MATERIAL
Original Filed Dec. 29, 1953 — 4 Sheets-Sheet 3
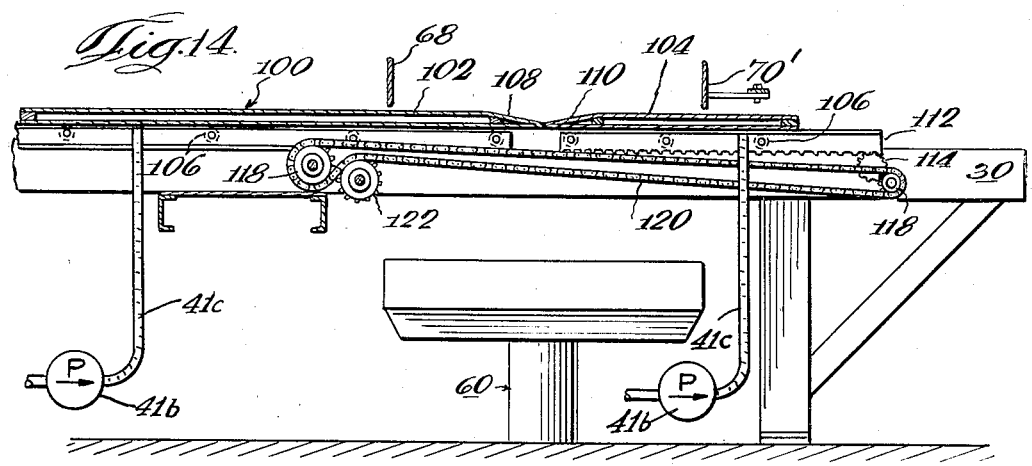
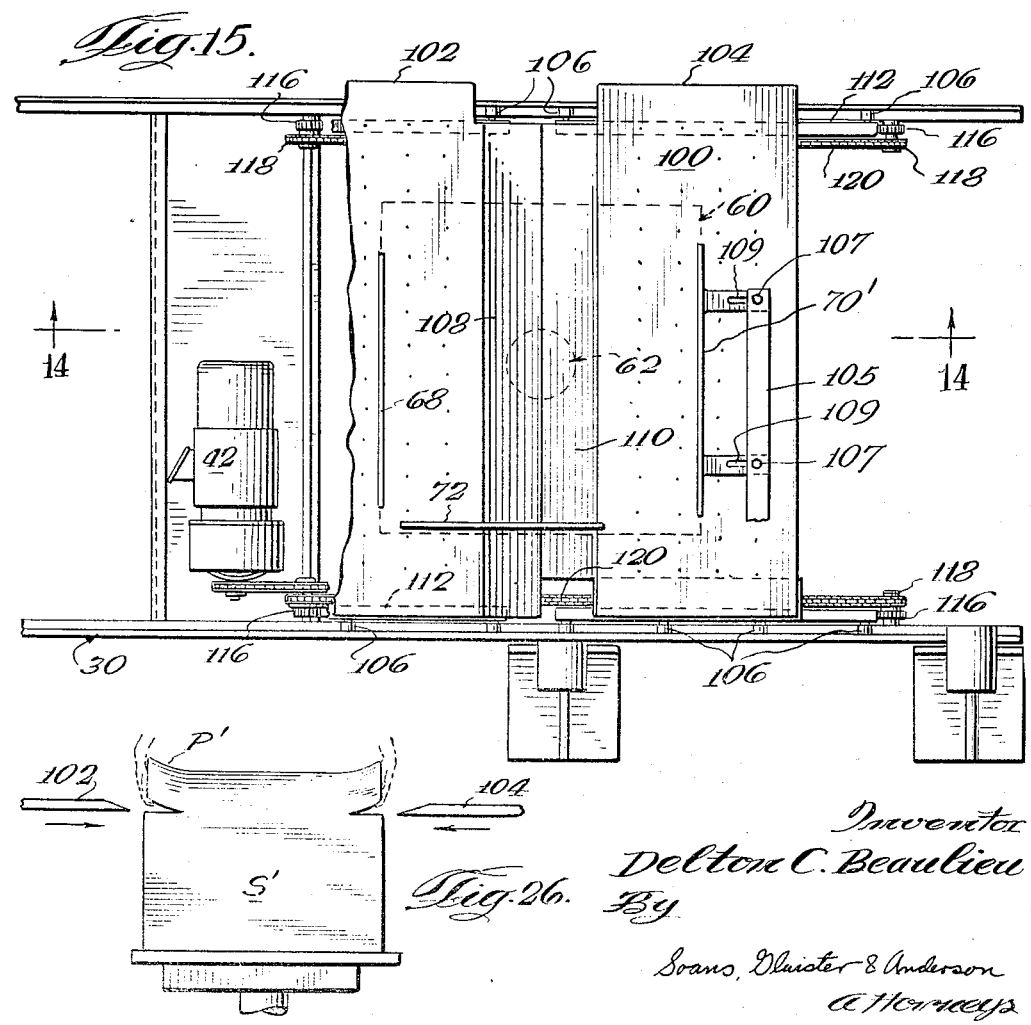
Inventor
Delton C. Beaulieu
By
Soans, Dluister & Anderson
Attorneys Nov. 15, 1960     D. C. BEAULIEU     2,960,243
METHOD AND APPARATUS FOR STACKING SHEET MATERIAL
Original Filed Dec. 29, 1953     4 Sheets-Sheet 4
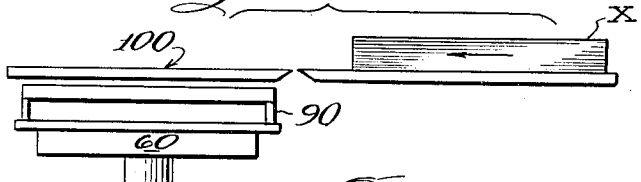
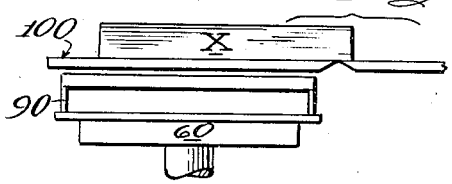
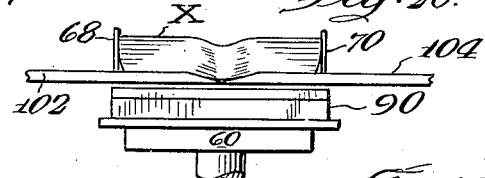
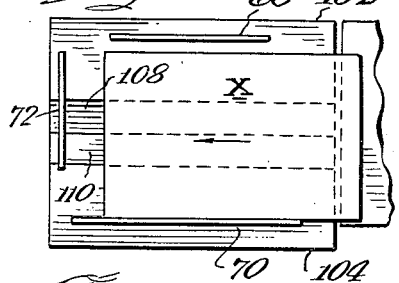
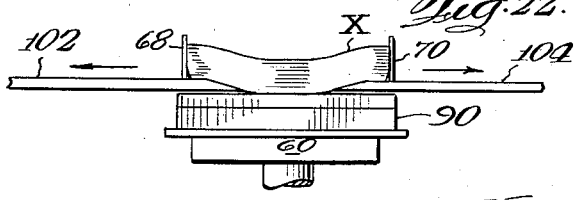
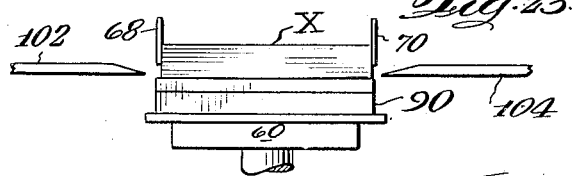
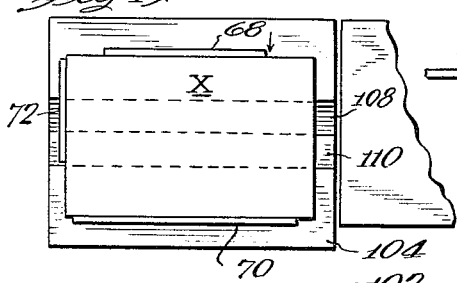
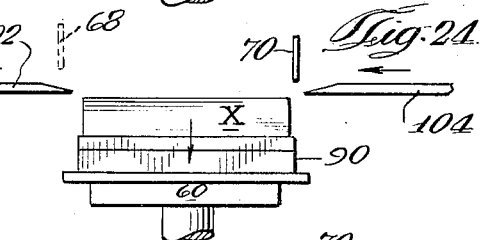
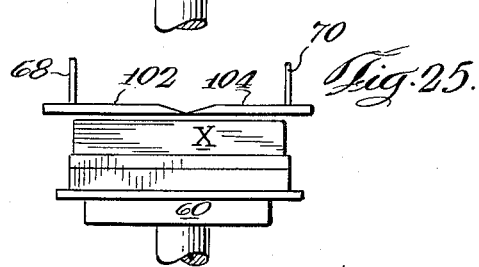
Inventor
Delton C. Beaulieu
By Evans, Plaister & Anderson
Attorneys

United States Patent Office 2,960,243
Patented Nov. 15, 1960

2,960,243

METHOD AND APPARATUS FOR STACKING SHEET MATERIAL

Delton C. Beaulieu, Neenah, Wis., assignor to Kimberly-Clark Corporation, Neenah, Wis., a corporation of Delaware Continuation of application Ser. No. 400,867, Dec. 29, 1953. This application Mar. 19, 1959, Ser. No. 800,521

13 Claims. (Cl. 214—6)

The present invention relates generally to the handling of sheet material, and is more particularly directed to a method and apparatus for assembling and dis-assembling piles of flexible sheet material, such as paper.

This application constitutes a continuation of my co-pending application, Serial No. 400,867, filed December 29, 1953, for Method and Apparatus for Stacking Sheet Material.

In the assembling of paper sheets and the like for shipment to the consumer, it is necessary that the sheets be arranged in vertically aligned stacks or lifts. An uneven stack of sheets not only presents a difficult problem in packaging, but also exposes the edges of the several sheets to possible damage. The latter problem is particularly troublesome and costly with respect to quality grade sheet material, wherein a damaged edge necessitates a rejection of the sheet. It will be apparent that a neatly aligned stack of sheet material is not only easier to package, but also presents smooth side surfaces which are better able to take blows without damaigng the edges of the individual sheets.

Various means and methods have been devised for stacking sheet material, but all of the prior devices require considerable manual handling of the sheets, and therefore, are far from being satisfactory. Each time that a pile of sheets is lifted by hand there is very likely to occur a certain amount of damage to the upper and lower sheets of the pile. Furthermore, manual handling of the sheets produces some lateral shifting of the sheet pile which makes it more difficult to achieve a vertically aligned stack of the sheets. Then too, the success of the prior stacking operations depends largely on the manual dexterity and skill of the stacking personnel and is, therefore, subject to considerable variation.

It is the primary object of the present invention to provide a novel and improved method and apparatus for stacking sheet material, which reduces the requirement for manual handling of the sheets during the stacking operation and provides for an exact sequential positioning of a plurality of piles of sheets in a defined area to thereby achieve a correct alignment of a stack formed from the piles. Another object of this invention is to provide improved stacking means affording the advantages described above, which is also operable to remove or unpile a vertically aligned pile of sheet material from a greater stack of sheets without disturbing the vertical alignment of the pile or the stack.

Other objects and advantages will become apparent as the disclosure progresses with respect to the accompanying four sheets of drawings, wherein:

Fig. 1 is a sectional view of one form of apparatus embodying the present invention, taken along the line 1—1 in Fig. 2.

Fig. 2 is a plan view of the embodiment of Fig. 1, with parts broken away.

Figs. 3 to 12, inclusive, are schematic illustrations of the the operation of the embodiment shown in Figs. 1 and 2.

Fig. 13 is a schematic illustration of the use of the embodiment in Fig. 1 for removing smaller piles from a stack of sheets.

Fig. 14 is a sectional view of another form of apparatus embodying the present invention, taken along the line 14—14 in Fig. 15.

Fig. 15 is a plan view of the embodiment in Fig. 14, with parts broken away.

Figs. 16 to 25, inclusive, are schematic illustrations of the operation of the apparatus shown in Figs. 14 and 15.

Fig. 26 is a schematic illustration of the use of the embodiment in Fig. 1 for removing smaller piles from a stack of sheets.

Fig. 27 is a fragmentary, plan view of a modified form of the loading table shown in Fig. 2.

With reference particularly to Figs. 1 and 2, it is seen that the apparatus chosen to illustrate the present invention comprises a frame structure 30, having four supporting corner posts 32 and a pair of elongated side members 34 which are disposed in spaced relation to each other and supported on the corner posts. The upper edges of the side members 34 provide a support for a relatively movable table 36 which is adapted to receive piles of sheet material, such as paper, thereon. More specifically, the upper edges of the side frame members are formed to include a pair of elongated track portions 38, and the table 36 is provided with a series of rollers 40 along opposite sides thereof which engage the tracks 38 to provide a rolling support for the table. The forward end 41 of the table 36 is tapered downwardly along its width to present a relatively sharp edge for reasons which will be discussed later.

It is also found to be very advantageous to have the upper surface of the table 36 made of a highly polished metal, and to employ air pressure through a large number of small openings or perforations 41a (Fig. 2) in the table to facilitate relative sliding movement between the table and a pile of sheets. Consequently, the table 36 is preferably made in the form of a hollow, flat structure providing an internal space 43 (Fig. 1) to which pressure air can be suitably introduced, as from a pump 41b discharging through a conduit 41c, for escape therefrom through the small openings or perforations 41a in the upper surface of the table. The air pressure through these openings provides a buoyant effect on a pile of sheets supported on the table, which makes it considerably easier to effect relative movement between the pile and the table.

A power driven means is provided for effecting controlled movement of the table 36 relative to the supporting frame structure 30. This drive means includes a motor 42, which is supported on the frame 30 in underlying relation to the table 36 by means of a sub-frame assembly 44 suitably fastened to the main frame 30, a pair of drive gears 46 which are fixed to opposite ends of a drive shaft 48 rotatably supported on the side frame members 34, and a pair of toothed racks 50 which are fixed to the under side of the table 36 on opposite sides thereof for meshing engagement with the drive gears 46.

Power is transmitted from the motor to the drive shaft 48 through a chain and sprocket connection, including a sprocket 52 fixed on the shaft 48, a sprocket 54 fixed on the motor drive shaft 56, and a chain 58 disposed around the sprockets 52 and 54. The motor 42 is reversible as to its direction of rotation and, consequently, the table 36 is selectively movable in opposite directions along the supporting frame structure 30.

A vertically movable platform 60 is disposed between the side frame members 34 in underlying relation to the table 36. The platform 60 is preferably in the nature of a hydraulic lift and includes a supporting post 62 disposed within a cylindrical recess 64, and a rectangular platform 66. Suitable means (not shown) is provided for effecting a raising and lowering of the post 62 relative to the recess 64, to thereby selectively position the upper surface of the platform 60 with respect to the path of the laterally movable table 36.

The main frame 30 also supports a pile aligning means in proximate overlying relation to the table 36 which includes a rear stop 68, a front stop 70, and an end plate 72. One of the stops is preferably adjustable in the direction of the movement of the table 36, in order to accommodate piles of various widths. In the illustrated apparatus, the rear stop 68 is indicated as being movable with respect to its supporting arm 74. The arm 74 is secured at one end portion to a channel 76, which is fixed to one of the side frame members 34, and the free end of the arm is connected with the rear stop 68 by means of a pair of bolts 78 which are slidable in a pair of slots 80 formed in rearwardly extending portions of the stop plate structure. Consequently, the stop plate 68 can be adjustably positioned relative to the front stop plate 70. It will be noted that the area defined by the pile aligning members 68, 70 and 72 is within the area of the underlying platform 66. It will also be noted from the drawings that the height of the pile aligning members is sufficient to engage the entire edge of the sheet pile.

Referring now to Figs. 3–11, the operation of the described structure will be explained. As seen in Fig. 3, the initial position of the apparatus for stacking is with the table 36 overlying the platform 66, and the latter is in its upper position to thereby place the upper surface of a skid 90 disposed thereon in closely underlying relation to the table.

A pile of sheets "A" is moved onto the table 36 from a trimmer lay-off table 82 or the like (Figs. 3 and 4), until the leading edge and one side edge of the pile engage the end plate 72 and the front stop 70, respectively. The rear stop plate 68 is then moved into engagement with the adjacent edge of the pile (Fig. 6), in order to thereby correct any misalignment of the pile which has occured during its movement onto the table 36. As noted also in Figs. 1 and 2, the described position of support for the pile "A" on the table 36 places the tapered table edge 41 beyond the front stop 70.

The table 36 is moved out of its pile supporting position, that is to the left as seen in Fig. 1, to thereby deposit the pile "A" on the skid. In this respect, it is preferable that the upper surface of the table 36 be a highly polished material, in order to present a minimum of resistance to the relative movement of the table with respect to the pile of sheets. As the table is withdrawn, the right edge of the sheet pile, as seen in Figs. 7–9, is eased downwardly along the inclined edge 41 of the table, which inclined edge provides a transfer means for facilitating movement of a pile of sheets relative to the table, to a position of engagement with the underlying portion of the upper surface of the skid 90. This frictional engagement with the skid is an important factor in maintaining the pile of sheets in position during the withdrawal of the table 36. The stops 68 and 70, of course, insure the maintaining of the fixed relation established by the frictional engagement between the pile and the skid 90 during the withdrawal of the table 36.

After the table 36 is completely withdrawn from beneath the pile "A" (Figs. 10 and 11), the platform 60 is lowered until the top sheet of the pile "A" is just below the path of movement of the table 36. At this stage of the operation the rear stop 68 may be moved out of position in readiness for movement of the next pile of sheets on to the table. The table 36 is then moved back to the right to its initial pile supporting position overlying the platform 60 and the pile "A" supported thereon. Consequently, the apparatus is now in position to receive another pile of sheets for the handling in the same manner. It will be noted that the succeeding pile will be similarly moved downwardly on to the top of the pile "A," and that the position of the pile aligning stop members 68, 70 and 72 will cause succeeding piles to be deposited on the platform 60 in precise vertical alignment with the pile "A."

It is recognized, however, that in some instances it may be desired to stack the several piles on the platform 60 in offset relation to each other. In such case the stop plate arrangement shown in Fig. 15 might be advantageously employed to position succeeding piles in laterally offset relation to each other, as by shifting the stop plates 68 and 70' back and forth for succeeding piles to thereby achieve the desired staggered arrangement of the piles.

When it becomes desirable to separate a stack of sheets into smaller piles, the above described apparatus may also be advantageously employed, as noted in Fig. 13 wherein a stack of sheets "S" is supported on the platform 60. The unpiling of the sheets may be achieved by generally reversing the procedure outlined above for the stacking operation. With the front stop 70 in edge-engaging relation to the upper portion of the stack "S," an opening is provided in the opposite edge of the stack, manually or otherwise, and the knife-like edge 41 of the table 36 is moved into the opening. The tapered end portion 41 of the table affords a relatively easy entrance of the table between a selected pair of sheets in the stack. If desired, the entry of the table 36 into the stack "S" may be further facilitated by having the tapered edge 41 of the table disposed diagonally of the path of movement of the table, as seen in Fig. 27. In this way only one corner of the pile "P" need be lifted, in order to position the table for separation of the pile from the stack. The front stop 70 maintains the vertical alignment of the pile portion "P," while the smooth surface table 36 cuts through the stack to a position of support for the separated pile. The pile "P" is then removed from the table, the table is withdrawn, and the platform 60 is elevated to a position wherein a succeeding portion of the stack is offered for removal.

Another form of the invention is shown in Figs. 14 and 15, wherein a divided table 100 is utilized to support the stack portions being handled. More specifically, the frame structure 30 supports a pair of table sections 102 and 104, each having a series of rollers 106 along opposite sides for supporting engagement with the track 38 in a manner similar to that described with respect to the embodiment in Fig. 2. The adjoining edge portions 108 and 110 of the table sections are downwardly inclined along their widths, as in the single table embodiment. There is also provided the pile-aligning means comprising the stop 68 and 70' and the end plate 72, as in the previous instance. However, in the divided table arrangement it is desirable that both the front and the rear stop plates be laterally adjustable, in order to be able to center various width piles with respect to the line of engagement of the two table sections 102 and 104. Consequently, the front stop plate 70' (Fig. 15) is connected to its supporting arm 105 by a pair of bolts 107 which are slidable in a pair of slots 109 formed in rearwardly extending portions of the stop plate structure.

The drive means for the table sections 102 and 104, which includes the motor 42, is adapted to afford simultaneous movement of the table sections, in opposite directions, at the same rate of speed. Each of the table sections, which are preferably air tables of the type described with respect to Figs. 1 and 2 supplied with air pressure from pumps 41b through conduits 41c, includes a pair of toothed racks 112 disposed for engagement with gears 114 which are rotatably mounted on the supporting frame 30. The gears 114 are driven from a pair of drive gears 116, which are chain driven from the motor 42. The drive gears 116 and a pair of drive sprockets 118 are mounted on a shaft for rotation together. In turn, the pair of aligned drive sprockets 118 for each side of the table sections 108 and 110 are drivingly interconnected by an endless chain 120. An adjustable idler gear 122 is disposed along a run of each of chains 120 to provide means for tensioning the chains.

As seen in Figs. 16-25, the operation of the divided table embodiment generally follows the principles of the single table arrangement. In the initial position for stacking, the platform 60 (Figs. 16 and 17) closely underlies the table 100 and the two sections 102 and 104 are moved into edge-engaging relation, with the line of engagement of the table sections preferably centered with respect to the platform 60. The pile "X" is positioned on the table with adjoining side edges engaging the end plate 72 and the front stop 70'. The rear stop 68 is then moved into engagement with the adjacent edge of the pile (Fig. 19), to insure proper vertical alignment thereof.

As seen particularly in Fig. 20, the pile "X" is now positioned within the area defined by the stops 68 and 70', with its center portion curved downwardly in general conformity with the abutting inclined edges 108 and 110 of the two table sections. As the table sections 102 and 104 are withdrawn, the center portion of the pile "X" contacts the underlying skid 90 for frictional engagement therewith. In many instances this initial contact between the bottom of the pile and the skid, together with the very low resistance of the polished table surfaces, will be sufficient to maintain the pile of sheets in position during the withdrawal of the table sections. However, the stop members 70' and 72 provide further assurance that the pile "X" will remain stable, in so far as lateral shifting is concerned, during the withdrawal of the two table sections.

After the pile "S" is thus disposed on the underlying skid 90, the platform 60 is lowered, the rear stop 68 is moved out of position, and the table sections 102 and 104 are returned to their side engaging position (Fig. 25) in readiness for receiving another pile of sheets.

As noted in Fig. 26, the divided table arrangement is also adaptable for unpiling a stack of vertically aligned sheets. However, in this instance it is necessary to provide an opening, manually or otherwise, in opposite edges of the stack "S." The position of these openings might readily be determined by the insertion of markers between a pair of sheets, on two sides of the stack, during the formation of the stack in the layboy. The entry of the table sections 102 and 104 into the openings in the side edges of the stack and their movement to a position of engagement between the tapered edges 108 and 110 will, of course, provide an independent support for the separated pile "P'." Here again, the stop plates 68 and 70' might be positioned to provide lateral support for the pile "P'," once the table sections 102 and 104 have entered the stack.

It is seen, therefore, that the present invention provides a novel method and apparatus for handling stacked sheet material in a manner assuring the maintenance of the vertical alignment of the sheets. This feature will be found to be particularly advantageous in connection with the handling of coated and supercalendered paper sheets which are more likely to spill when stacked than most other types of sheet material. It is also of primary importance to maintain a vertical alignment of sheets which are to be printed, in order to avoid damage to the edges of such sheets. A torn edge might easily cause damage to the printing plates and thereby result in a costly shut down of the printing press.

Moreover, the improved method and apparatus virtually eliminates manual labor with respect to the stacking and unpiling operations afforded thereby. This latter factor is important both with respect to personnel efficiency and, also, with respect to the amount of waste normally encountered due to the manual handling of the stack portions.

As pointed out above, apparatus constructed in accordance with this invention is not only useful in connection with the production of sheet material and its preparation for shipment, but is also very useful to the consumer who uses but a portion of the stack at a time. The unpiling operation offers the advantage of a saving in labor costs, as well as diminishing the amount of waste of the sheet material normally encountered through manual handling of the sheets. The latter feature is particularly important with respect to quality grades of paper.

Although shown and described with respect to particular forms of apparatus, it will be apparent that other forms of apparatus might well be designed to accomplish similar results, without departing from the principles of the present invention.

What is claimed is:

1. Means for stacking a number of piles of lightweight and relatively limp paper sheets in vertical alignment comprising, a vertically movable platform, a horizontally movable support having its path of movement overlying said vertically movable platform, and a vertically disposed, elongated stop means positioned in closely overlying relation to the path of movement of said support to position a pile of sheets thereon in overlying relation to said platform, said horizontally movable support having a perforate upper surface and downwardly inclined edge portion generally transversely of the direction of movement of said support, means providing pressure air through the perforate surface of said support to provide a buoyant effect on the pile being supported thereby and said platform being vertically movable relative to a position closely underlying said support, whereby a pile of said sheets may be placed on said support in close relation to the underlying platform, and whereby said pile may be deposited on said platform through withdrawal of said support from beneath said pile, said inclined edge of said support serving to guide the downward movement of successive portions of the pile into frictional engagement with the underlying platform whereby said increasingly greater frictional engagement and said pressure air on the bottom of the pile provide a free withdrawal of said support without disturbing the vertical alignment of the pile.

2. Means for handling a stack of lightweight and relatively limp paper sheets comprising a platform, a support disposed for lateral movement relative to a position overlying said platform, said support comprising a pair of table sections movable in opposite directions with respect to an edge-abutting position overlying an intermediate section of said platform, each of said table sections including a downwardly inclined surface portion along the edges disposed for contact with each other, and means providing relative vertical movement between said platform and said support, said inclined edge portions serving to guide the vertical movement of successive portions of the stack so as to provide free relative movement of said support without disturbing the vertical alignment of the stack.

3. Means for handling a stack of lightweight and limp paper sheets comprising a vertically movable platform, a support disposed for lateral movement relative to a position overlying said platform, said support comprising a pair of table sections movable in opposite directions with respect to an edge-abutting position overlying an intermediate section of said platform, each of said table sections including a downwardly inclined surface portion along the edges disposed for contact with each other, and each of said table sections including a perforate upper surface through which pressure air is blown, whereby said stack may be readily deposited on said platform by said table sections without altering the disposition of said stack, said inclined edges affording a minimum vertical movement of the stack on to said closely underlying platform as said table sections are moved in opposite directions, and said pressure air providing a buoyant effect on the stack portion engaging said table sections to thereby provide free withdrawal of the table sections.

4. Means for handling a stack of lightweight and relatively limp paper sheets comprising a vertically movable platform, a support disposed for horizontal movement relative to a position closely overlying said platform, said support comprising a pair of table sections movable in opposite directions with respect to an adge-abutting position overlying an intermediate section of said platform, each of said table sections including a downwardly inclined surface portion along the edges disposed for engagement with each other, means for moving said table sections relative to each other at a substantially uniform rate of speed, and a pair of adjustably positionable stop members disposed transversely of the path of movement of said support in spaced-apart relation to each other, said stop members being positioned within the boundary of said platform and in closely overlying relation to the path of movement of said support, whereby the movement of said table sections in opposite directions causes said stack to move down said inclined edges into frictional engagement with said platform, and whereby said stop members serve to maintain said stack against lateral shifting during said movement on to said platform.

5. Means for handling a stack of lightweight and relatively limp paper sheets comprising a platform, a support disposed for lateral movement relative to a position overlying said platform, said support comprising a pair of table sections movable in opposite directions with respect to an edge-abutting position, and means providing relative vertical movement between said support and said platform, whereby said table sections can be positioned in closely overlying relation to said platform and the withdrawal of said table sections away from said edge-abutting position is effective to deposit a stack of sheets carried by the table sections onto the platform in a manner affording frictional engagement of the bottom of the stack with said platform over an expanding area as said table sections are separated.

6. Means for handling a stack of lightweight and relatively limp paper sheets comprising a platform, a support disposed for lateral movement relative to a position overlying said platform, said support comprising a pair of table sections movable in opposite directions with respect to an edge-abutting position overlying an intermediate section of said platform, each of said table sections having a perforate upper surface, means providing pressure air through the perforate surface of each of said table sections to provide a buoyant affect on a stack of sheets supported thereby, and means providing relative vertical movement between said support and said platform, whereby said table sections can be positioned in closely overlying relation to said platform and said table sections can be moved away from their edge-abutting position to deposit a stack of sheets thereon onto the platform in a manner affording expanding engagement of the bottom of the stack with said platform.

7. Means for handling a pile of lightweight and relatively limp paper sheet material comprising a platform, a horizontal table disposed for lateral movement relative to a position closely overlying said platform, a vertically disposed elongated stop means positioned with respet to said platform and the path of movement of said table to fix the position of a pile of sheets on said table in overlying relation to said platform as the pile is moved onto said table in edge-abutting relation to said stop means, said table having a perforate upper surface and including transfer means along one edge of said table for facilitating movement of a pile of sheets across said one edge in moving between said table and said platform, and means providing for the directing of pressure air upwardly through said perforate surface.

8. Means for handling a pile of lightweight and relatively limp paper sheet material comprising a platform, a horizontal table disposed for lateral movement relative to a position closely overlying said platform, a vertically disposed and elongated stop means adjustably positioned in overlying adjacent relation to the path of movement of said table to determine the position of at least one edge of a pile of sheets thereon as the pile is moved onto said table, said table having a perforate upper surface, and means directing pressure air through said perforate surface, said table including transfer means along one edge thereof for facilitating movement of a pile of sheets between said table and said platform, and said table being movable relative to said stop means, whereby said table may be moved relative to said stop means and a pile of said sheet material may be transferred between said platform and said table across said one edge, while maintaining alignment of the sheets in the pile through the cooperation of said stop means, table edge transfer means and air pressure with said moving table.

9. Means for stacking a number of sheets of lightweight and relatively limp material in vertical alignment comprising a platform, a horizontally movable support having its path of movement overlying said platform, said horizontally movable support having a substantially flat perforate upper surface and an edge of decreased thickness extending generally transversely of the direction of movement of said support, and means providing air under pressure through the perforate surface of said support to provide a buoyant effect on a pile of sheets supported by said support, said platform being vertically movable relative to a position closely underlying said support, whereby a pile of sheets may be placed on said support in close relation to the underlying platform and whereby said pile may be deposited on said platform through withdrawal of said support from beneath said pile, said support edge of decreased thickness serving to guide the downward movement of a pile of sheets into frictional engagement with the underlying platform whereby said frictional engagement with the underlying platform is increased and said air pressure on the bottom of the pile provides free withdrawal of said support.

10. Means for handling a pile of lightweight and relatively limp paper sheets comprising a platform, a horizontal table for holding said pile of paper sheets, means for movably supporting said table so that it has a path of movement to overlie said platform, said table having a substantially flat perforate upper surface and having a tapered edge portion extending generally transversely of the direction of movement of said table, said table having air passages therein connected to the perforations of its upper surface, means providing air under pressure to said passages and perforations to provide a buoyant effect on a pile of paper sheets supported by said table, and means for supporting said platform to render it vertically movable to a position closely underlying said table whereby a pile of paper sheets may be placed on said table in close relation to the underlying platform and whereby said pile may be deposited on said platform through withdrawal of said table from beneath said pile with said tapered edge serving to guide the downward movement of the pile into frictional engagement with the underlying platform to thereby increase said frictional engagement and said air pressure on the bottom of said pile transmitted through the perforations of the table providing a free withdrawal of said table.

11. Means for handling a stack of lightweight and relatively limp paper sheets comprising a platform, a support comprising a pair of table sections overlying said platform and having abutting edges above an intermediate part of said platform, means supporting said sections to allow said sections to be moved apart from their edge-abutting positions in opposite directions, said table sections each having at least one cavity therein and having a substantially flat perforated upper surface and said abutting edges being downwardly tapered, and means providing air under pressure to said cavities of said table sections and through the perforated surfaces of said sections to provide a buoyant effect on the stack of paper sheets supported by said sections, said tapered edges serving to guide the vertical movement of the stack into frictional engagement with the underlying platform and the air pressure on the underside of the stack providing easy withdrawal of each of said table sections.

12. Means for handling a stack of sheets of lightweight and relatively limp material comprising a platform, a support for the stack and disposed for lateral movement in a certain direction to a position overlying said platform, said support having a substantially flat perforated upper surface, means providing air under pressure through the perforated surface of said support to provide a buoyant effect on the stack supported by said support, and means providing relatively vertical movement between said platform and said support whereby the stack may be placed on said support in close relation to the underlying platform and whereby the stack may be deposited on said platform through withdrawal of said support from beneath the stack with the air under pressure facilitating such withdrawal of said support, said support being formed with a downwardly tapered edge surface which extends transversely and slantwise of said direction of movement of said support so as to serve to guide the downward movement of the stack into frictional engagement with said underlying platform.

13. Means for stacking sheets of light weight and relatively limp material in vertical alignment comprising a platform member and a support member, said support member being at a higher level than said platform member and one of said members being horizontally movable in a path of movement so that the support member overlies the platform member, said support member having a substantially flat perforate upper surface and an edge of decreased thickness extending generally transversely of said path of movement, and means providing air under pressure through the perforate surface of said support member to provide a buoyant effect on a pile of sheets supported by said support member, one of said members being vertically movable with respect to the other of said members so that said platform member or sheets of said material thereon closely underlies said support member whereby a pile of sheets on said support member may be deposited on said platform member or on a pile of sheets on said platform member by separating horizontal movement of one of said members with respect to said other member, said edge of decreased thickness serving to guide the downward movement of a pile of sheets on said support member into frictional engagement with the underlying platform member or with sheets of said material on the platform member whereby the area of contact with the underlying platform member or sheets thereon is increased and said air pressure on the bottom of the pile on said support member facilitates transfer of the pile on said support member to said platform member.

References Cited in the file of this patent

UNITED STATES PATENTS

| | | |
|---|---|---|
| 1,600,958 | Hart et al. | Sept. 21, 1926 |
| 1,787,572 | English | Jan. 6, 1931 |
| 2,065,674 | Fay | Dec. 29, 1936 |